March 11, 1947.  J. H. SCHREIBER  2,417,132
MACHINE TOOL
Filed Feb. 1, 1943  9 Sheets-Sheet 2
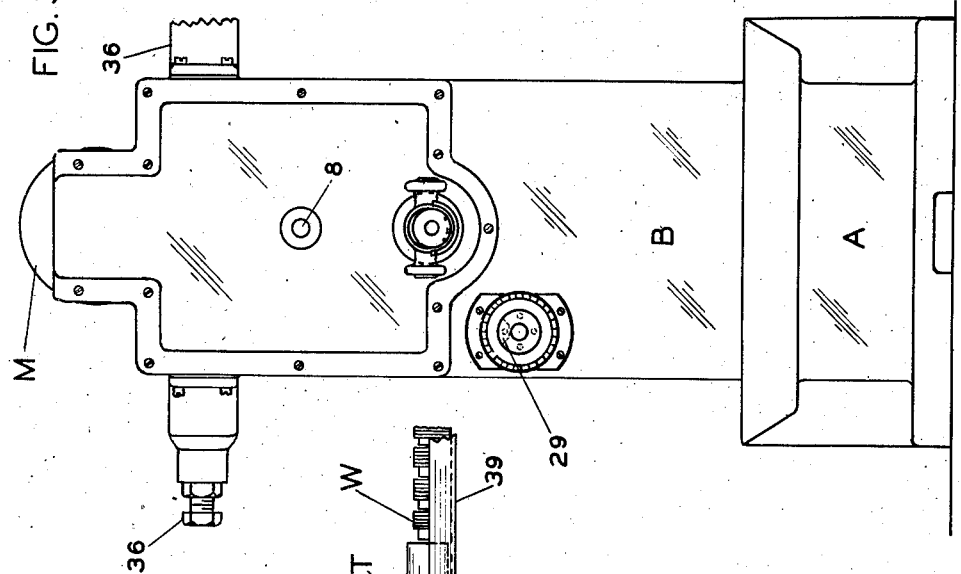
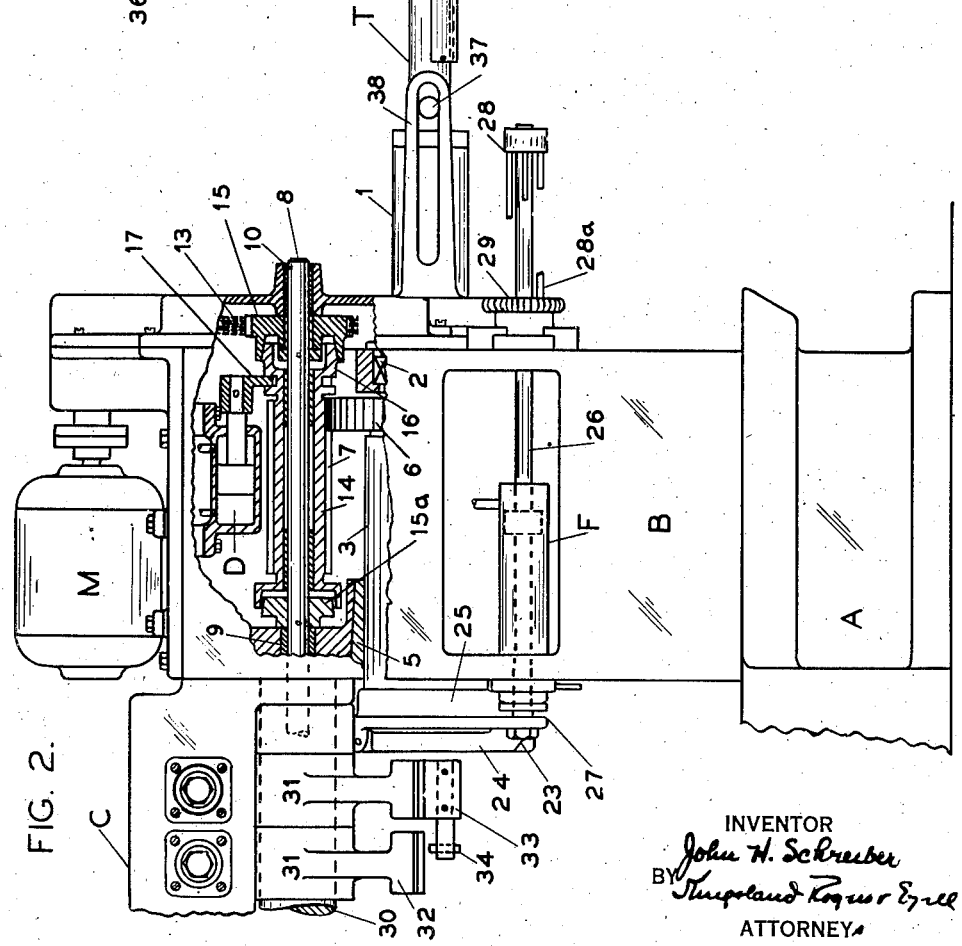
INVENTOR
John H. Schreiber
BY
Kingsland Rogers Ezell
ATTORNEYS

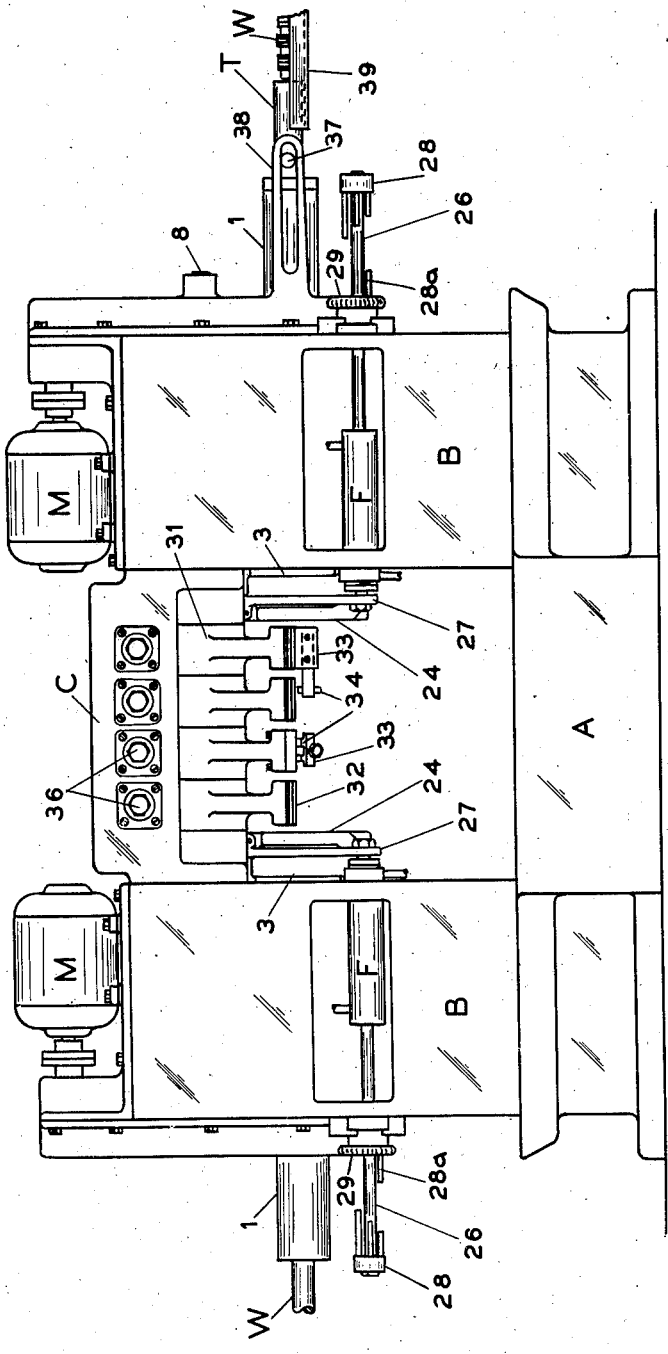

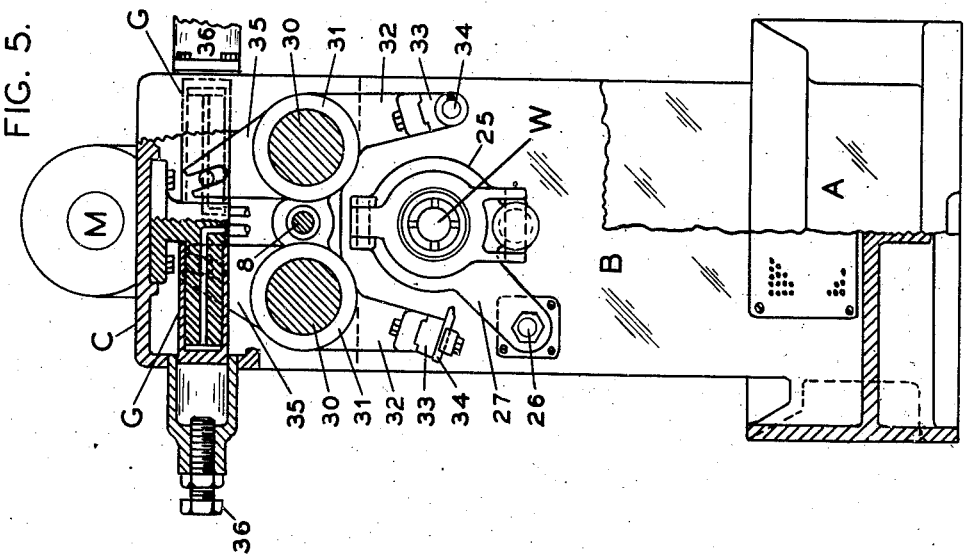
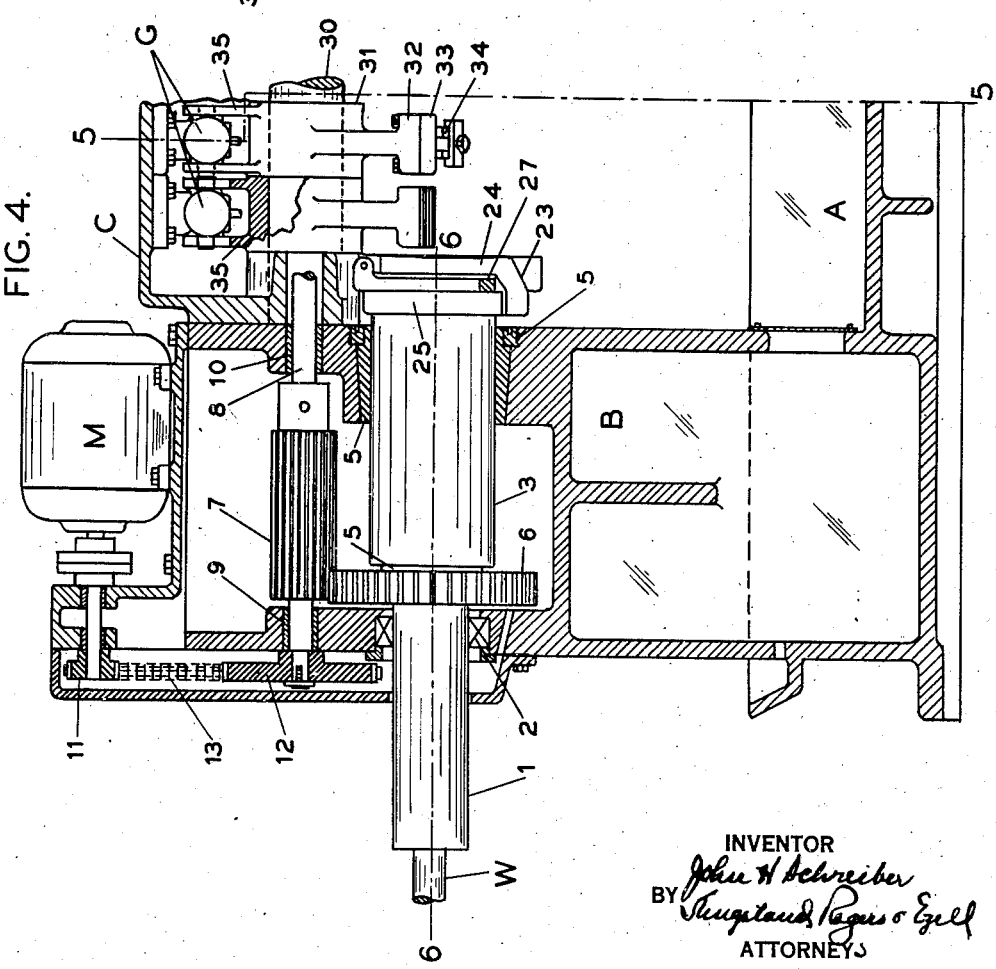

March 11, 1947.　　J. H. SCHREIBER　　2,417,132
MACHINE TOOL
Filed Feb. 1, 1943　　9 Sheets-Sheet 4

INVENTOR
John H Schreiber
BY Kingsland Rogers Gell
ATTORNEYS

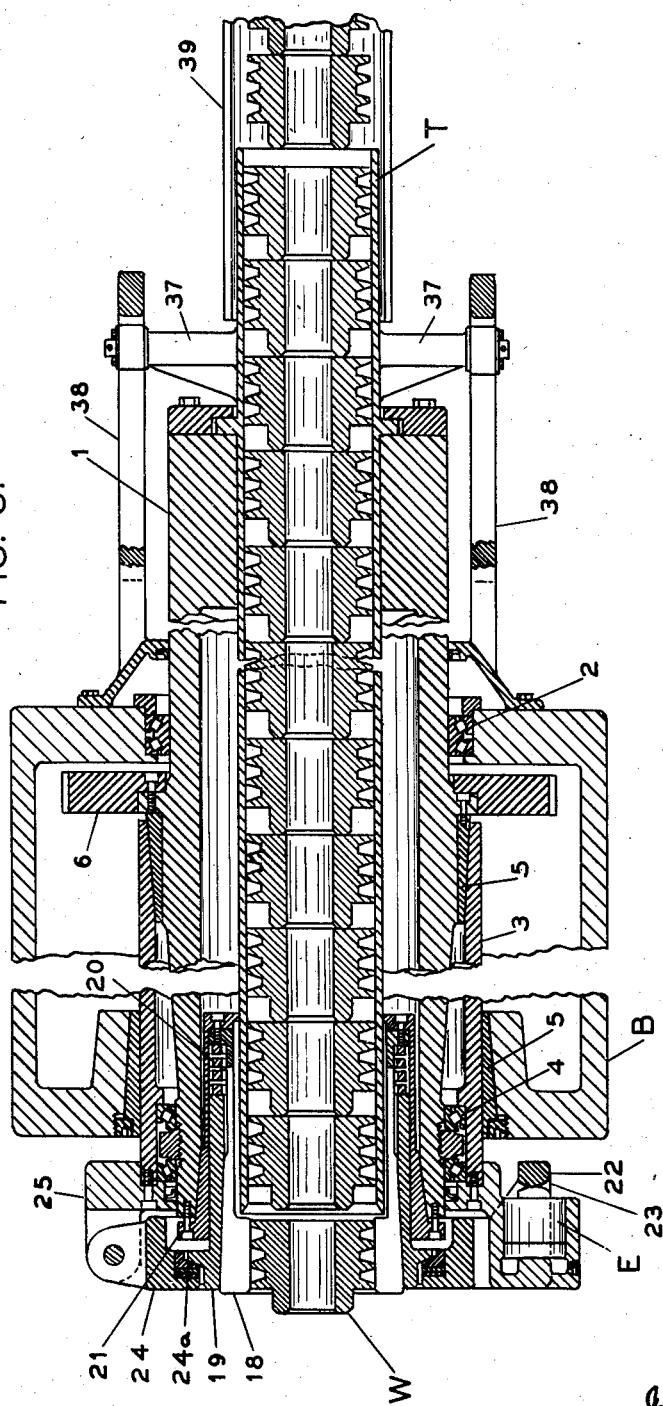

March 11, 1947.   J. H. SCHREIBER   2,417,132
MACHINE TOOL
Filed Feb. 1, 1943   9 Sheets-Sheet 6

INVENTOR
John H Schreiber
BY
Kingsland Rogers Ezell
ATTORNEYS

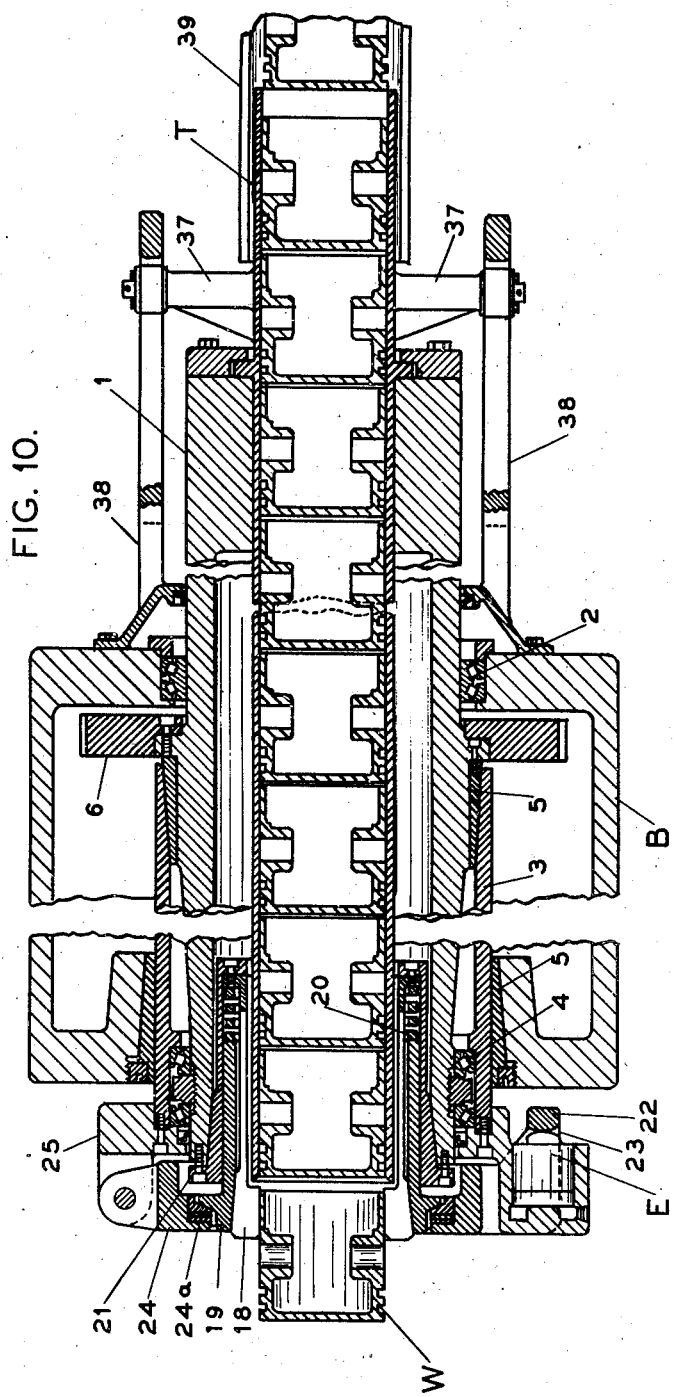

March 11, 1947.  J. H. SCHREIBER  2,417,132
MACHINE TOOL
Filed Feb. 1, 1943  9 Sheets-Sheet 8
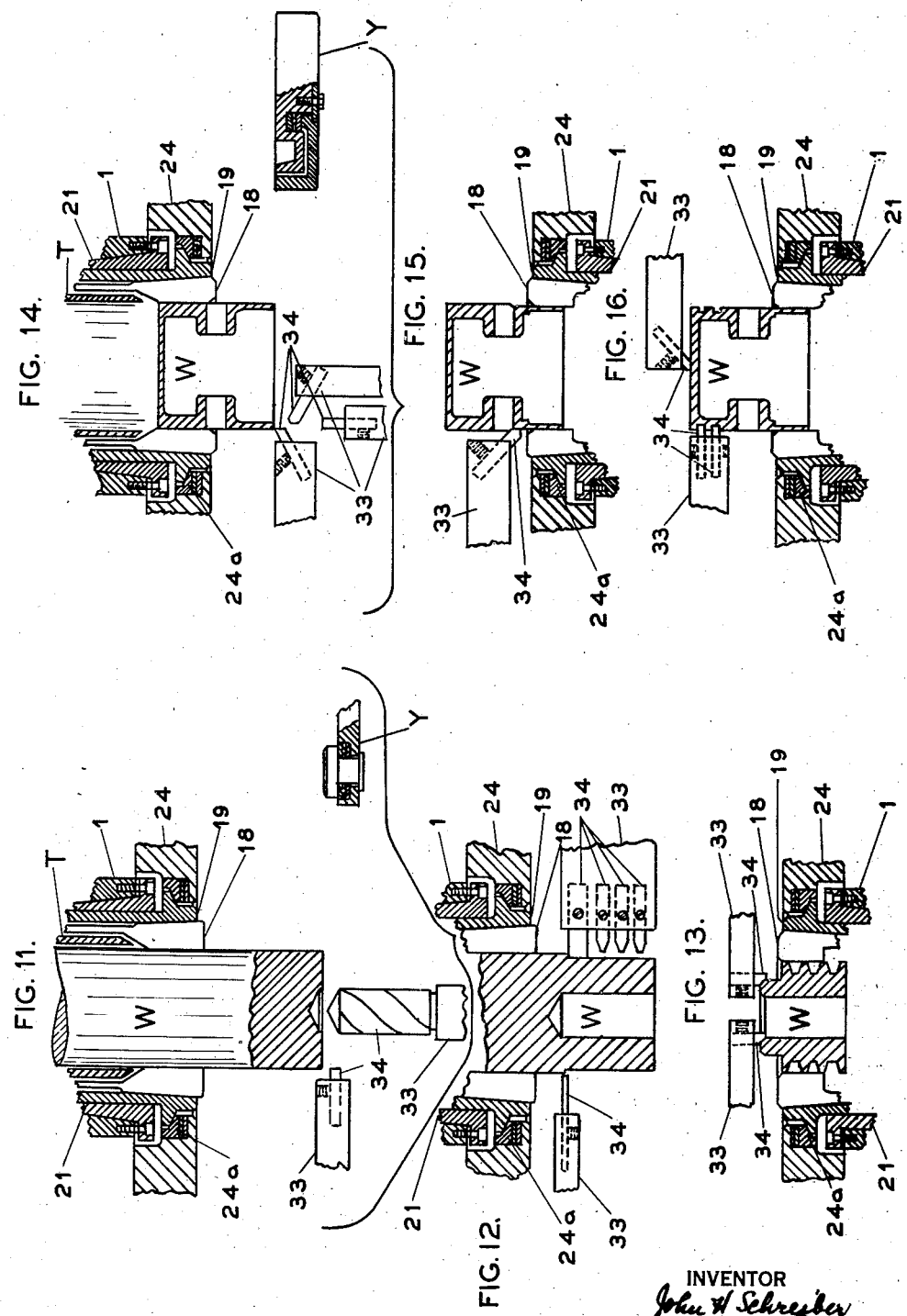
INVENTOR
John H. Schreiber
BY
ATTORNEYS

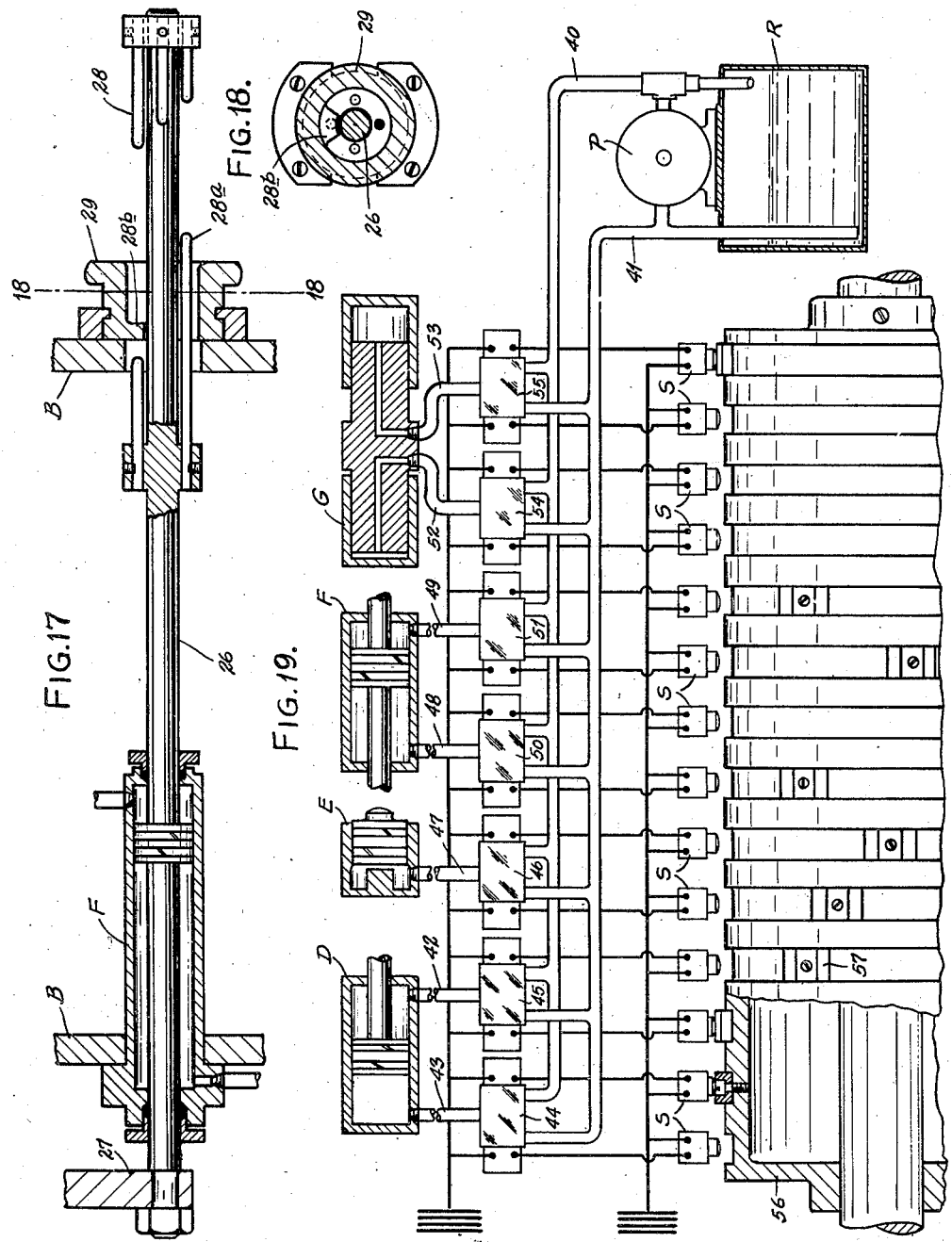

Patented Mar. 11, 1947

2,417,132

UNITED STATES PATENT OFFICE 2,417,132

MACHINE TOOL

John H. Schreiber, St. Louis, Mo.

Application February 1, 1943, Serial No. 474,239

11 Claims. (Cl. 82—2)

This invention relates to improvements in machine tools, and more particularly in dual spindle lathes.

An object of the invention is to provide a construction whereby a work piece may be moved longitudinally through the machine, and transferred from one work holding means to another, in order that complete machining operations may be performed on all surfaces of the work piece without removal from the machine.

Another object of the invention is to provide a lathe that is capable of supporting a work piece on both ends, with means for rotating it about its axis while so held, together with means to move the work piece longitudinally of its axis in either direction across selected cutting tools to perform selected machining operations on the work piece.

Another object of the invention is to provide a lathe having longitudinally alined hollow spindles, equipped with work holding means, with provision for effecting relative movement of the spindles, and for driving the same at selected speed ratios to each other.

Another object of the invention is to provide a lathe of simplified construction capable of completely machining selected work pieces, with a minimum of manual manipulation, thereby appreciably increasing the rapidity of the machining operations, with a minimum of labor.

Other objects will appear from the following detailed description of the construction, representing a preferred embodiment of the invention, taken in connection with the accompanying drawings, in which:

Fig. 1 is a front elevation of the lathe;

Fig. 2 is a front elevation, partially in section, of one head of the lathe and associated parts;

Fig. 3 is an end elevation of the same;

Fig. 4 is a vertical section of the opposite head to that illustrated in Fig. 2, illustrating more in detail the associated parts;

Fig. 5 is a vertical section on the line 5—5 of Fig. 4;

Fig. 8 is a similar view of the opposite spindle and associated parts, illustrating the means for moving the completed work pieces through the lathe;

Fig. 10 is a view similar to Fig. 8, but illustrating the handling of work pieces, as in Fig. 9;

Figs. 11, 12 and 13 are fragmentary views illustrating selected progressive machining operations on a cylindrical or bar work piece; and, Figs. 14, 15 and 16 are views similar to the last mentioned illustrations, but illustrating operations in connection with a preformed cast work piece.

Fig. 17 is an enlarged longitudinal sectional view of the stop device for determining the extent of the protracted and retracted movement of the spindles.

Fig. 18 is a cross section through the stop device on the line 18—18 of Fig. 17.

Fig. 19 is a diagrammatic illustration of the selective control mechanism for the various operating parts of the machine.

In general, the tool embodying the invention consists of a base A supporting at each end a housing B. Each housing B carries a duplicate machine head, comprising a hollow spindle, the driving mechanism therefor, and the work holding means, all of which are described in detail hereinafter. The prime mover for the spindles are motors M, one mounted on the top of each of the housings B. An intermediate housing C, located between the upper part of the housings B constitutes a support for the tool holder arms.

As the spindles, the work support means, and the drive means for the spindles are substantially duplicate in construction for each head, it will be understood that the description of the one applies to the other, except where the differences are noted.

Figure 7:
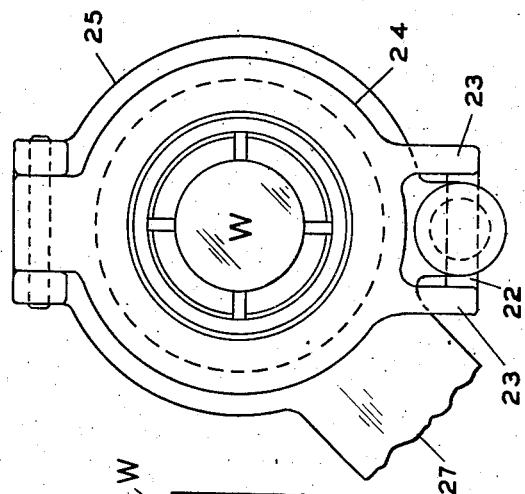
Fig. 7 is a right end view of the parts shown in Fig. 6.
Figure 6:
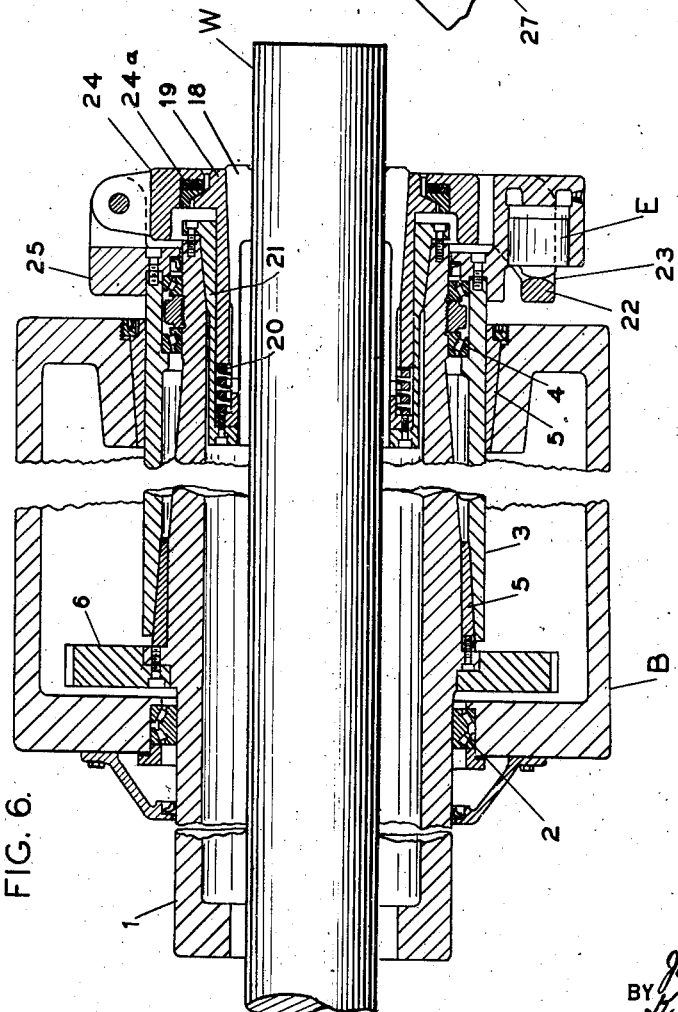
Fig. 6 is a contracted cross section particularly illustrating the right hollow spindle, and the associated holding means, for a cylindrical work piece taken substantially on the line 6—6 of Fig. 4.
Figure 9:
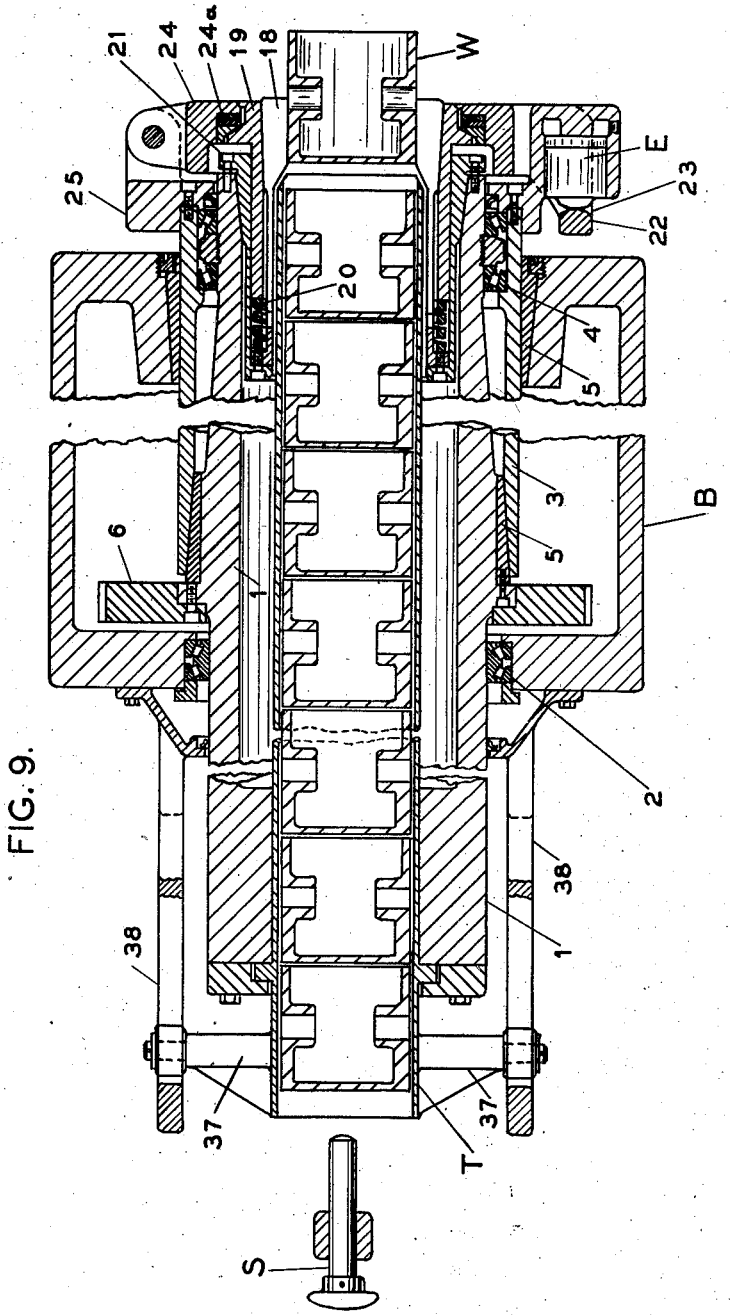
Fig. 9 is a similar view to Fig. 6, illustrating the operation in connection with preformed castings as the work pieces.

A cylindrical spindle 1, having a hollow bore throughout its length, is mounted in the housing and supported for rotation. The outer end of the spindle is rotatably mounted in respect of the housing by an anti-friction bearing 2, which seats in a socket in the housing as best illustrated in Fig. 9. The inner end of the spindle is supported in a spindle support 3 by an anti-friction bearing 4 between the support and the spindle. The spindle support is slidable longitudinally, but is non-rotatable. It is associated with the housing and the spindle by wedge shaped bushing members 5 that serve to aline the spindle support and the spindle.

The spindle carries within the housing a ring gear 6 that meshes with a wide faced pinion 7 supported on a shift 8, in order that the spindle when moved longitudinally will not unmesh the drive therefor.

The shaft 8 is supported at one end by a bearing 9 and extends longitudinally therefrom to the opposite head of the lathe, where it is supported in a bearing 10 formed in a boss in the outer wall of the end of the right-hand housing.

The shaft 8 is driven from the motor M by a speed reduction chain drive. A sprocket 11 on the motor shaft is operatively connected with a sprocket 12 on the end of the shaft 8, by a chain belt 13.

In the opposite head, the shaft 8 has loosely mounted thereon a drive pinion 14, which is adapted to be selectively connected with a friction clutch sprocket 15, operatively connected with the motor M on the right end of the lathe (Fig. 2), or with the shaft 8, for direct drive from the left-hand motor.

Since the pinion 14 is longitudinally shiftable, it is obvious that either connection can be made by bringing either a friction clutch 15a between the shaft 8, and the pinion 14 into engagement, or a friction clutch 16 between the sprocket 15 and the pinion 14 into engagement. It should be noted that the diameter of the sprocket 15 is less than the sprocket 12, so that when driven from the right-hand motor a less reduction in the drive speed is effected.

The driving means thus described will be recognized as affording flexibility in controlling the rotation of the two spindles. They may be driven at the same speed from the shaft 8, or may be independently driven at selected variable speeds. The importance of this will later appear.

Any selected means may be employed for effecting the optional engagement of the clutches 15 and 16. A convenient means is illustrated in the form of a fluid motor D operatively connected with the sliding pinion 14 by an arm 17.

Each spindle at its inner end is provided with a work-holding chuck. It will be understood to include a split collet 18 forced into clamping engagement with the work piece by a slidable sleeve 19 pressed outwardly by a strong expansion spring 20 seated between the arms of the collet and a sleeve member 21, interposed between the slidable sleeve 19 and the inner wall of the spindle 2. The inner face of the sleeve 19 and the outer face of the collet arms are oppositely tapered, so that outward pressure against the sleeve 19 contracts the split collet, forcing it into contact with the work piece with sufficient clamping power to clutch the work piece to be rotated with the spindle.

The release mechanism for the collet chuck comprises a fluid motor E, which, when actuated, exerts pressure against a bar 22 carried by the bifurcated lever 23 on a ring 24. The ring 24 is pivoted at its upper end to a sleeve 25, rigid with the spindle support. When the motor E is actuated, the ring 24 is moved inwardly at its lower end, and thereby forces the sleeve 19 inwardly contracting the spring 20. The clamping engagement of the collet with the work is thereby released.

It should be noted that the ring 24 has interposed between its inner face and the shoulder of the sleeve 19 a bushing assembly 24a, the inner member of which has a spherical contact with the shoulder on the sleeve 19. This permits an equalized circumferential thrust against the end of the sleeve 19 while rotating, from the ring 24 that is non-rotating.

The means illustrated for moving the inner ends of the spindle toward and away from each other comprises for each head, a fluid motor F. The inner end of a piston rod 26 of the motor F connects with an arm 27 carried by the sleeve 25 that embraces the spindle support 3. By controlling the fluid pressure in the fluid motor F, the longitudinal movement of the spindle support, and thereby of the spindle, may be optionally controlled.

The specific construction of the movement limiting device is not embraced within this invention, as it has been employed in its specific form in multiple spindle lathes.

It will be understood that the construction includes a collar supported at the outer end of the piston rod 26 which collar carries an annular series of inwardly projecting stop pins 28. The stop pins 28 vary in length, so that they project inwardly from the end of the piston rod different distances, whereby the extent of the retraction movements of the spindles may be gauged and limited.

At an intermediate location on the piston rod 26 is a second collar that supports a series of stop pins 28a that extend outwardly and function to determine the extent of selective protraction movement of the spindles.

Both series of stop pins are preferably removable and interchangeable, so that the distance of protracted and retracted movements of the spindles may be selectively determined.

An abutment device, comprising a revoluble sleeve 29, preferably provided with a knurled head is supported in a retaining member mounted on a wall of the housing B. The sleeve 29 has an axial opening around the piston rod 26. A segmental abutment 28b (Fig. 18) extends inwardly from the inner circumferential wall of the sleeve and is adapted to be aligned axially with the slective stop pins 28 and 28a by rotating the sleeve. Thus, when the sleeve is rotated by the operator to selected circumferential position, the abutment may be brought into alignment with selected ones of the stop pins, thereby arresting the movement of the piston rod 26, at selective longitudinal limits of movement in either direction. In this manner, the extent of the spindle movements, either to protract or retract them, is determined.

It will be understood that as the respective spindles are protracted and retracted for the lathe heads, the work piece clamped in the chuck mechanism is moved longitudinally in the path of selected cutting tools, that may be selectively moved into operative position in respect of the work piece. The means for supporting and adjusting the cutting tools appears best in Fig. 5.

Within the housing C are two shafts 30, disposed above and offset on each side of the spindle axis. As illustrated each shaft carries a plurality of tool holder supports, each comprising a hub 31, and a downwardly extending arm 32, adapted to have connected therewith at its lower end a tool holder 33. Selected types of cutting tools 34 may be mounted in the holders 33. An arm 35 slotted at its upper end is formed integral with the hub 31.

The means for actuating the tool holder supports comprises fluid motors G, each of which includes a stationary piston and a slidable cylinder. Transverse pairs of the tool holder supports are connected with the respective slidable cylinder of the motors G by pin and slot connections. When the fluid motor is operated to slide the cylinder thereof to one side or the other, the corresponding tool holder support will be actuated to bring the tool holder and the cutting tool carried thereby into operative relation with the workpiece. The transverse movement across the work piece can thus be regulated as desired by the operator, so that each tool holder can be independently adjusted. By manipulation of the stop devices 36, the sliding movement of the respective cylinders of the motors G may be limited.

As has been noted, the lathe is capable of machining either bar stock or preformed castings, and in the drawings I have illustrated the application to both uses.

When bar stock is used, a work piece, as illustrated in Fig. 4, shown as cylindrical and indicated by W, is inserted in the hollow spindle carried by the left-hand head of the machine, in which it is inserted manually or by any automatic feed device desired, and moved forward a selected distance until the inner end thereof has been inserted through the chuck device a predetermined distance. Thus, the part to be machined extends inwardly from the chuck and the chuck is then closed. The closing of the chuck is effected by admitting fluid pressure through the motor E (Fig. 9) by any of the usual means for controlling pressure by fluid which may be either automatically or manually operated. The selected cutting tools are then brought into operative relationship with the extended portion of the bar, and the spindle is moved longitudinally forward in cutting relation with the tools, and at the same time the tools may be moved transversely of the axis of the bar.

The movement of the spindle longitudinally and of the chuck carried thereby is progressively effected and regulated by admission of fluid pressure to the cylinder of the fluid motor F (Fig. 2) through an inlet pipe connected with the cylinder, which action moves the spindle support with the rotating spindle carried thereby progressively outwardly in relation to the selected tool brought into operative position therewith. It will be understood that the movement of either of the spindle supports may be regulated so that they may be stopped in a stationary position or be moved outwardly or inwardly at regulated speeds.

After the surfaces of the work piece that extend beyond the chuck on the first spindle have been completed, the two spindles with the driving adjustment arranged to operate both at the same speed are moved into juxtaposition, so that the extending end of the work piece enters the chuck of the second spindle. The work piece may then be separated from the bar by a cutting tool, after which it may be released from the first chuck, and the progressive machining operation completed with the other set of cutting tools, and a new section of the bar moved into operative position in the first chuck.

It is obvious, therefore, that the several progressive machining operations may be carried on at the same time, and that all surfaces of the work piece may be brought into operative relationship with the selected cutting tools without removal from the lathe.

Furthermore, instead of separating a selected work piece from the bar stock, before the machining operations in the second chuck are performed, the bar stock may be fed through the first chuck and the extending end of the bar protracted into the second chuck, so that the section intermediate the two chucks is rigidly supported for machining operation while the work piece section is rotated at the same speed, while held at both extremities thereof. In such circumstances, the drive for the spindle is from a single motor in the left-hand head of the tool, but the drive also provides for the flexibility, so that after the work piece is separated from the bar, it may be rotated at a different speed from the speed of the first spindle by shifting the drive from the common drive from the left-hand motor to the drive for the second spindle in the right-hand head of the lathe.

It is thus obvious that there is a wide flexibility of the lathe for the performance of the selected machining operations.

In order to afford a concrete example, there is illustrated in Figs. 11 to 13, inclusive, a series of machining operations on bar stock. In Fig. 11, the bar has been protracted from the chuck a predetermined distance limited by a stop device Y fragmentarily illustrated in the view, as it is no part of the present invention. A boring tool has been positioned in the axis of the bar and a side cutting tool is in position to machine the side surface of the bar. As the spindle is moved forward, the axis of the bar is bored, and a side cut of the bar stock is effected. In Fig. 12, at the right-hand side, is illustrated a series of side cutting tools for grooving, the periphery of the work piece, and a second cutting tool is in position to machine the head of the work piece. To the left of this view is a cut-off tool, all of these cutting devices being operable at the same time to produce the work piece illustrated in Fig. 13. When the work piece has been cut off, it will be understood that it has already been engaged by the second chuck, and the end of the work piece that had previously been held in the first chuck is exposed for the machining operation, such as is illustrated in Fig. 13, that consists of chamfering inside and outside of the trailing end of the bore formed in the work piece.

After the progressive machining operations have been performed on the work piece, the finished piece is released from the second chuck, and is fed forwardly in the hollow bore of the second spindle, particularly as illustrated in Fig. 8.

Inasmuch as the continuous rotation, after the work piece has been finished, might result in damage thereto, there is provided an internal tube T that fits within the bore of the spindle. This tube T extends beyond the open outer end of the spindle, and is connected with a cross arm 37 that operates in slotted arms 38 supported respectively at the front and back of the housing A. The tube is, therefore, held against rotation while permitting the spindle to continue rotation. The progressive pressure from the inner end of the spindle by the insertion of the finished work pieces moves the work pieces contained in the tube T progressively forwardly, feeding them onto a conveyor 39, if desired.

The various operating movements of the machine, which primarily include the selected control of the speed of rotation of the spindles, the opening and closing of the chucks carried by the spindles, the protraction and retraction selectively of the spindles, and of the movement of the tool holders to bring the tools into operative relationship with the work, may be accomplished by any known means, but, in order to lend clarity to the disclosure, a suitable mechanism is illustrated diagrammatically in Fig. 19.

The primary operative power for each of the operations is a fluid motor. Each of the several motors may be connected with a common source of fluid power.

By reference to the diagrammatic showing in Fig. 19, the piping system will be obvious.

It will be understood that the operating system includes a fluid reservoir R, and a pump P for generating the fluid pressure. The pump is designed to force fluid from the reservoir into the pressure side of the system, and to create a suction by withdrawal of fluid from the suction side of the system and discharge into the reservoir, in a manner well understood.

A manifold pressure conduit 40 is arranged to be operatively connected with the motors D to G, inclusive, through branch pipe connections, and a suction manifold 41 is adapted to be connected by branch conduits, respectively, with said fluid motor devices.

With particular reference to the motor D that is the control for the speed change of the spindles, it will be noted that this motor includes a double acting piston that receives and releases pressure on opposite sides of the piston from both the pressure manifold and the suction manifold through branch pipes 42 and 43, each of which is controlled through a solenoid valve 44 and 45, respectively.

The chuck operating motors E (only one of which is illustrated in the diagram for simplification) is single acting, and is connected through a solenoid valve 46 to the pipe 47 with the pressure and suction conduits.

The motors F (only one being shown), by which the spindle retraction and protraction movements are controlled, is a double acting piston motor connected respectively on opposite sides of the piston with the pressure and suction conduit through pipes 48 and 49, controlled respectively by solenoid valves 50 and 51.

The motors G (only one being shown) that operate the selective movement of the tool holders is of a reciprocating cylinder type, the piston being stationary, and is, therefore, operated through pressure delivered to the motor through pipes 52 and 53, respectively, at opposite ends of the cylinder, said pipes being controlled through solenoid valves 54 and 55.

The solenoid valves for controlling the respective fluid motors are operated by a series of switches, marked S, the operating characteristics of which are well understood in the art, so that further description is unnecessary. It will be understood, however, that they may be independently manually controlled, or controlled in timed relation by an index drum 56, provided with a series of circumferential adjustable switch operating cams 57, whereby the switches may be operated in timed relation by the circumferential adjustment of the cams that contact upon revolution of the drum 56 with selected switch contact members, and thereby the solenoid valves controlled selectively to impart to the fluid motors the actions and reactions required for the operation of the machine.

It is obvious that the drum may be power operated, if desired, or may be manually rotated, all of which operations are well understood in the art.

In order to clarify the operation of the construction, the machining of a work piece diagrammatically illustrated in Figs. 14–16, inclusive, will be described.

It will be assumed at the start of the operation, that both spindles are operatively connected with the prime mover to rotate them at the same speed by the selected operation of the fluid motor D. Both chucks, carried respectively by the spindles, are opened by controlling the operation of the motors E, and all of the tool holders are positioned in idle or retracted position out of the path of movement of the spindles by the selective operation of the motors G.

Through the selected operation of one of the motors F, the left hand spindle of the machine is protracted a limited distance. The extent of the protraction is controlled by the stop mechanism, and the spindle is retained in this position by the fluid pressure in the fluid motor F, acting in opposition to the stop mechanism.

The casting to be machined is then moved through the hollow left hand spindle into the open chuck until it comes into contact with the bottom of the groove of the stop Y, which is mounted on one of the tool holder supports 31—32, which has been moved by one of the motors G, to align the work piece axially with the spindle.

When the work piece has been properly aligned, the chuck is closed by a selected operation of the valve controlling the release of pressure in one of the motors E, permitting the spring 20 of the motor to actuate the chuck jaws to firmly grip the work piece W.

The next operation is to retract the spindle by operation of the selected valve controlling the motor F and, after the spindle has been retracted, to release the work piece from the aligning groove in the stop Y. The valve controlling the release of pressure in the selected motor G is then operated, moving the tool holder that supports the stop Y out of the axis of the spindles.

Selected tool holder supports for carrying the required tools for the first machining operation (Fig. 14) are then moved into position to contact with the work piece, and the spindle carrying the work piece is advanced at a selected speed toward the tools until the exterior, interior, and the end portion of the work piece are machined by the tools as diagrammatically illustrated in Fig. 14.

After this operation has been accomplished, the first spindle is retracted to permit movement of all of the tool carriers out of the spindle axis.

The next operation is the transfer of the work piece to the right hand or second spindle to permit completion of the machining of the piston on its closed end.

This operation is accomplished by protracting both spindles until the open end of the work piece has been inserted into the chuck of the right hand or second spindle. The proper adjustment of the work piece in the second chuck, that is to say, the extent to which the work piece enters the chuck may be accurately gauged by proper setting of the stop device that controls the longitudinal movements of the spindles.

The chuck of the second spindle is then operated to grip the work piece by the motor E, operatively connected with the right hand chuck. When the work piece is securely gripped, the first chuck is operated to release the opposite end of the work piece to permit the first spindle to be retracted.

It should be noted that, after the chuck of the first spindle is released, while the machining operation is being accomplished upon the work piece in the second chuck, the first chuck is free to receive a new work piece, so that the machining operations in both chucks may be conducted simultaneously. The operation is repeated as already described.

The completion of the operation on the work piece now positioned in the second chuck is accomplished by moving selected tool holders, carrying the appropriate tools (such, for example, as illustrated in Fig. 15) into the axis of the spindle and held, in proper operative position, by adjustment of the screw 36 (Fig. 5), constituting the stop device for the fluid motor G.

The exterior machining of the work piece is then accomplished by the rotation and longitudinal movement of the second spindle.

When the machining operation has been accomplished, the tools are moved to inoperative position, the operation being effected by the operation of the proper switches controlling the solenoid valves, and thereby the fluid pressure in the selected fluid motor G.

The exterior machining of the work piece by the tool diagrammatically illustrated in Fig. 15 requires full retraction movement of the second spindle.

After the operations, illustrated in Fig. 15, have been accomplished and the tool holders are moved to idle position, a pair of tool holders from the opposite side are moved into operative position.

One tool holder carries a pair of tools for machining the piston ring grooves and the other tool holder carries a tool holder for machining the closed end surface of the piston (Fig. 16). After the operation is performed by this set of tools, the tool holders carrying said tools are moved to inoperative position.

The operation of the machine may be timed so that, when the operation of finishing the first work piece has been completed, the second work piece is in a condition to be received in the second chuck The release of the first work piece, and the engagement in the second chuck of the second work piece is accomplished as follows. The chuck of the second spindle is opened and the spindles are moved so as to bring the adjacent chucks into closed relationship, the second partially finished work piece being gripped in the first chuck, and the first finished work piece being released in the second chuck. The second work piece moves into the second chuck, thereby forcing the completely finished piston through the chuck into the stationary tube T and the partially finished second work piece is moved into the second chuck, and the chuck closed.

The operations in connection with preformed castings are illustrated particularly in Figs. 9 and 10. Since the work pieces here are ordinarily fed into the machines as separate units, the receiving spindle is likewise equipped with a tube to prevent initial rotation of the work piece until it is received in the spindle chuck. It will be understood that the work pieces are fed into the receiving spindle and may be manually moved forward. A push rod construction, illustrated fragmentarily in Fig. 9 and indicated by S, may be utilized, if desired, to feed the work pieces forwardly, or suitable automatic means for feeding the work pieces either singly or in series, may be employed.

Pressure on the work pieces at the receiving end of the spindle moves the series of work pieces forwardly until the inner one of the series is protracted into the first chuck a predetermined distance, that may be determined by a stop device. When so positioned, the chuck is closed and the machining operation on the exposed surface performed. When the first series of machining operations has been completed, the two spindles are moved into juxtaposition, so that the machined portion of the work piece is received in the second chuck, and the chuck closed, whereupon the first chuck is released in order to receive another work piece.

It is thus apparent from the exemplifications of the operations possible with the construction of the invention, that it has a wide versatility of use, and that the progressive machining operations can be performed in a greatly reduced period of time over tools that require removal and rechucking in separated spindles, and that the machine may be operated with a minimum amount of manual manipulation.

It is to be understood that in describing specific construction, the invention is not to be limited, but what I claim and desire to secure by Letters Patent is:

1. In a lathe, the combination with a pair of rotating spindles in longitudinal alinement, of a work holding chuck carried by the adjacent ends of said spindles respectively, means for selectively protracting and retracting each of said spindles to and from each other, selective means for clamping and releasing said chucks, a prime mover for driving said spindles in unison, a second prime mover for driving one of said spindles independently of said first named prime mover, and selective means for connecting both of said spindles with said first prime mover, or independently with said prime movers.

2. In a machine tool of the class described, the combination with a base and a pair of housings supported at spaced intervals on said base, a slidable non-rotatable spindle support in each of said housings said spindle supports having relative longitudinal movement in respect of each other, power means for moving said spindle supports, a spindle revolvably mounted in said spindle support, a chuck carried by each spindle at its opposing adjacent end for engaging and holding a work piece, a plurality of cutting tool supports pivoted intermediate of the adjacent end of said spindles, and means for moving selectively said cutting tool supports transversely of the path of the longitudinal movement of said spindles.

3. In a lathe, the combination with a pair of rotating hollow spindles in longitudinal alinement, of a work holding chuck carried by the adjacent ends of said spindles respectively and adapted to receive work pieces carried in said spindles, a non-rotating hollow work support mounted in the bore of one of said spindles, means for selectively protracting and retracting each of said spindles to and from each other, selective means for clamping and releasing said chucks, and selective drive means for rotating said spindles.

4. In a machine tool of the class described, the combination of spaced machine heads, with a hollow spindle mounted in each of said heads in longitudinal alignment and movable outwardly and inwardly with respect to said heads, means for selectively moving said spindles longitudinally, a chuck carried by the adjacent ends of said spindles adapted to receive work pieces within the bore of one of said spindles and to discharge work pieces into the bore of the other spindle, a plurality of tool holder supports mounted in the space between said heads and movable toward and away from the axis of said spindles but having a fixed relation to said heads, means for progressively moving said spindles selectively outwardly and inwardly with respect to said heads and across said tools supported by said tool supports for progressive machining operations.

5. In a machine tool of the class described, the combination with a base and a housing supported at each end thereof, of a working head in each of said housings, a non-rotatable spindle support in each of said heads mounted for longitudinal movement, a hollow spindle adapted to receive work pieces therein rotatably mounted in each of said spindle supports, a chuck for receiving the work fed thereto through the hollow spindle carried by each of the adjacent ends of said spindles, a tool holder support mounted between said heads, adjustable tool holders aligned on said support and movable toward and away from the axis of said spindles to bring tools for different operations into operative relationship with work carried by said spindles, means for moving said spindles longitudinally in the space between said heads to carry the work for progressive machining operations across the tools supported by said tool holders.

6. In a lathe, the combination with a pair of rotating spindles in longitudinal alignment, of a work holding chuck carried by the adjacent ends of said spindles, respectively, means for selectively protracting and retracting each of said spindles to and from each other, selective means for clamping and releasing said chucks, means for driving said spindles in unison, means for driving one of said spindles independently of the other, and selective means for connecting both of said spindles for rotation in unison, or for disconnecting said spindles for independent rotation.

7. In a lathe, the combination of a pair of spaced spindle heads, a spindle mounted in each of said heads in permanent axial alignment and for independent rotation, and adapted to receive within the bores thereof work pieces, a nonrotatable support for the work piece carried within the spindle bores, of a work holding chuck carried by each spindle, said chucks being permanently axially aligned, disposed apart and spaced from each other, means for independently moving said spindles longitudinally to a position that the work piece in one chuck may be transferred to the other chuck while the machine is in operation, and selective means for clamping and releasing said chucks.

8. In a machine tool of the class described which includes a pair of spaced working heads, a spindle mounted in each of said heads for relative longitudinal movement, means for selectively moving said spindles, and a work supporting chuck carried by each of said spindles in opposed axial alignment, a tool carrier support, a tool carrier pivotally mounted thereon for rocking movement into and out of the path of longitudinal movement of said spindle, and means for moving said tool carrier to selected adjustment.

9. In a lathe, the combination comprising a pair of rotating hollow spindles supported in longitudinal alignment, and a non-rotating hollow work support in each of said spindles adapted to permit the movement of the work longitudinally therethrough, a chuck carried by the opposing ends of said spindles respectively, means for selectively protracting and retracting each of said spindles toward and away from each other, selective means for clamping and releasing said chucks, a prime mover, selective driving means between the prime mover and said spindles, including a clutch device for controlling said driving means to rotate said spindles simultaneously in synchronism or independently of each other.

10. In a lathe, the combination with a pair of rotating spindles in longitudinal alignment, of a work holding chuck carried by the adjacent ends of said spindles respectively, means for selectively protracting and retracting each of said spindles to and from each other, selective means for clamping and releasing said chucks, means for driving said spindles synchronously in unison, means for driving one of said spindles independently of the other, a tool carrier support mounted above said spindles, tool carrying arms pivoted on said support, and movable in an arc to and from the axis of said spindles, means for moving said tool carrying arms, and means for holding said arms in selected adjustment.

11. In a lathe, the combination comprising a working head and a hollow spindle mounted therein for rotary and longitudinal axial movement, a chuck carried by said spindle, a non-rotating hollow work support in said spindle adapted to permit the movement of the work from and to the chuck through said support, a tool support for holding a tool in the path of movement of said spindle, and means for rotating said spindle and moving the same longitudinally.

JOHN H. SCHREIBER.

REFERENCES CITED

The following references are of record in the file of this patent:

UNITED STATES PATENTS

| Number | Name | Date |
|---|---|---|
| 330,600 | Marsh | Nov. 17, 1885 |
| 1,912,515 | Davenport | June 6, 1933 |
| 2,087,109 | Lee | July 13, 1937 |
| 2,182,939 | Brinkman | Dec. 12, 1939 |
| 1,982,964 | Rupple | Dec. 4, 1934 |
| 1,914,984 | Smith et al. | June 20, 1933 |
| 1,972,595 | Libby | Sept. 4, 1934 |
| 2,319,963 | Wilson | May 25, 1943 |
| 2,061,417 | Drissner | Nov. 17, 1936 |
| 2,048,107 | Collins | July 21, 1936 |
| 1,334,335 | Warren | Mar. 23, 1920 |